United States Patent

[11] 3,622,573

[72] Inventor George F. Schlaudecker
 Toledo, Ohio
[21] Appl. No. 745,366
[22] Filed July 17, 1968
[45] Patented Nov. 23, 1971
[73] Assignee The Sherwin-Williams Company
 Cleveland, Ohio
 Continuation-in-part of application Ser. No. 663,199, Aug. 13, 1967, now abandoned, which is a continuation-in-part of application Ser. No. 510,034, Nov. 26, 1965, now abandoned. This application July 17, 1968, Ser. No. 745,366

[54] 3-AZAISATOIC ANHYDRIDE
 1 Claim, No Drawings
[52] U.S. Cl. .................................................. 260/244 R,
 260/256.4 F, 260/295.5 A
[51] Int. Cl. .................................................. C07d 39/00
[50] Field of Search .................................. 260/244, 244 A

[56] References Cited
 UNITED STATES PATENTS
 3,324,119 6/1967 Hill et al. .................... 260/244

Primary Examiner—Henry R. Jiles
Assistant Examiner—G. Thomas Todd
Attorney—Owen & Owen ABSTRACT: A heterocyclic compound of the formula

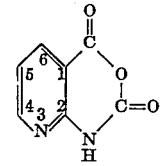

for which the trivial designation 3-azaisatoic anhydride is suggested, and a method for the production thereof.
The method includes reacting, in an aqueous solution and at a temperature below 40° C., quinolinimide, a substantially equimolecular proportion of sodium hydroxide, and about one mole of sodium hypochlorite per mole of quinolinimide, and, for maximum yield, subsequently adjusting the pH to a predetermined level.

3-AZAISATOIC ANHYDRIDE

This is a continuation-in-part of copending application Ser. No. 663,199, filed Aug. 13, 1967 now abandoned which was a continuation-in-part of application Ser. No. 510,034, filed Nov. 26, 1965, now abandoned.

The foregoing heterocyclic compound is believed to be new, and is useful as a chemical intermediate enabling the production of certain 2-amino-N-substituted nicotinamides and 3-substituted pyrido[2,3-d]pyrimidine-2,4(1H,3H)-diones: compounds which have known herbicidal activity. A particularly useful amide is 2-amino-N-isopropylnicotinamide; a particularly useful dione is 3-isopropyl pyrido[2,3-d]pyrimidine-2,4(1H,3H)-dione.

An object of this invention is the provision of 3-azaisatoic anhydride, and a method of making the compound.

Other objects and advantages will be apparent from the description to follow.

In general, the method of this invention comprises reacting, in an aqueous solution, quinolinimide, a substantially equimolecular proportion of sodium hydroxide, and about 1 mole of sodium hypochlorite per mole of quinolinimide, and carrying out the reaction at a temperature not higher than about 40° C.

The amount of water used to form the aqueous solution should be at least sufficient to dissolve the sodium salt of the quinolinimide which is believed to form as an intermediate product during the course of the reaction.

In a preferred embodiment the pH of the reaction mixture is adjusted to one between 5½ and 7½ shortly after all the reactants are added, i.e., within about ½ to 1 minute. It is not essential that this be done, however, because as the reaction progresses the pH of the reaction mixture lowers automatically and stabilizes within the desired range. Greater yields, however, are obtained when the pH is adjusted artificially shortly after the reactants are admixed.

In still another preferred embodiment the method of this invention comprises (1) mixing quinolinimide and a substantially equimolecular proportion of sodium hydroxide with a quantity of water, the water being in an amount and at a temperature at least sufficient to dissolve the sodium quinolinimide which is formed, (2) thereafter adding about one mole of sodium hypochlorite per mole of quinolinimide to the resulting solution, and (3) adjusting the solution to and maintaining it at a pH within the range of about 5½ to 7½, and carrying out the reaction at a temperature not more than about 40° C. Optimum results are achieved by this method.

The following examples illustrate the preparation of 3-azaisatoic anhydride, and are to be construed only as further illustrating and disclosing, but in no way as limiting the invention.

EXAMPLE 1

A 250 ml. beaker equipped with a stirrer and thermometer, and surrounded by a cooling bath, was charged with 45 ml. tap water and 2.0 grams NaOH pellets. The pellets were dissolved and the solution cooled to a temperature of 25° C. The solution in the beaker was stirred with a propeller-type agitator during the rapid addition of 7.4 grams quinolinimide. Agitation was continued throughout the remaining steps of the process. 45 seconds after the quinolinimide was charged, a 3.72 gram portion of sodium hypochlorite in solution* was added to the reaction mixture. (At this point the temperature of the reaction mixture was 27.5° C. and the pH of the mixture was 12.1). The entire reaction mixture was stirred for 15 seconds and then approximately 3.8 ml. HCl was added to bring the pH down to 6.2. After the addition of the HCl the temperature of the reaction mixture was 33° C.

About 3 minutes and 15 seconds after the addition of sodium hypochlorite a slurry began to form. The reaction was continued for a total of 23 minutes and 15 seconds after the addition of sodium hypochlorite, at which time the reaction mixture was filtered. The filter cake was washed with water and dried. The total recovery amounted to 2.3 grams or 28.0 percent of theory. The material was light brown in color and had a melting point of 204.0°–205.0° C. (dec.).

From the time of pH adjustment until the reaction mixture was filtered the pH ranged from 6.2 to 6.4.

EXAMPLE 2

A 600 ml. beaker equipped with a stirrer, and thermometer, and surrounded by a cooling bath was charged with 100 ml. water and 4.0 grams sodium hydroxide pellets. The pellets were dissolved and the solution was cooled to a temperature of 24° C. The solution in the beaker was then stirred with a propeller-type agitator during the rapid addition of 14.8 grams quinolinimide. Agitation was continued throughout the remaining steps in the process. Thirty seconds after the addition of the quinolinimide 5.58 grams sodium hypochlorite was charged into the reaction mixture. The pH of the reaction mixture at the time sodium hypochlorite was charged was 11.5. Thirty seconds later, when the pH had dropped to 11.4, 5.9 ml. hydrochloric acid was added to the reaction mixture. This brought the pH down to 6.0. The reaction was then continued for a period of 29½ minutes during which time the temperature of the reaction mixture rose to 31.5° C. and the pH rose to 6.28. The slurry which had formed was filtered and crude 3-azaisatoic anhydride was recovered, washed with water and dried at a temperature below its decomposition point. The total recovery was 5.4 grams or 32.9 percent of theory. The material was light tan in color and had a melting point of 204.5°–205.5° C. (dec.).

EXAMPLE 3

A 250 ml. beaker equipped with a stirrer and thermometer and surrounded by a cooling bath was charged with 45 ml. water and 2.0 grams sodium hydroxide pellets. The pellets were dissolved and the solution was cooled to 25° C. Then the solution in the beaker was stirred with a propeller-type agitator during the rapid addition of 7.4 grams quinolinimide. Agitation was continued throughout the remaining steps in the process. During the 45 seconds after the addition of the quinolinimide, the temperature of the reaction mixture rose to 27.0° C. At that time 3.72 grams sodium hypochlorite was charged into the reaction mixture. The pH of the reaction mixture at the time sodium hypochlorite was charged was 12.1; 35 seconds later 4 ml. hydrochloric acid was added to the reaction mixture. This brought the pH down to 6.2. The reaction was then continued for a period of 16½ minutes during which time the temperature of the reaction mixture rose to 36° C. and the pH rose to 6.3. At this time the slurry which had formed was filtered and crude 3-azaisatoic anhydride was recovered, washed with water and dried at a temperature below its decomposition point. The filtrate was reacted for an additional 14 minutes at which time NaCl was added to precipitate any remaining product. Thereafter a second crop of reaction product was filtered out in the same manner as the first. The total recovery was 2.3 grams or 28.0 percent of theory. The material was medium tan in color and had a melting point of 208.0°–208.5° C. (dec.).

---

*The sodium hypochlorite solution was prepared by dissolving 181.9 grams chlorine in a solution of 210 grams sodium hydroxide in 2,250 ml. water. The sodium hydroxide solution was at a temperature of about 0° C. at the time of the chlorine addition. The sodium hypochlorite solution assayed 77.84 grams sodium hypochlorite and 2.34 grams sodium hydroxide per liter; it was stored at about 0° C. until used.

EXAMPLE 4

A 250 ml. beaker equipped with a stirrer and thermometer, and surrounded by a cooling bath was charged with 50 ml. water and 2.0 grams sodium hydroxide pellets. The pellets were dissolved and the solution in the beaker was cooled to 20° C., and then stirred with a propeller-type agitator during the rapid addition of 3.72 grams sodium hypochlorite. (Agitation was continued throughout the remaining steps in the process.) Immediately thereafter 7.4 grams of quinolinimide was charged to the reaction mixture. The pH of the reaction mixture at the time quinolinimide was charged was 11.8; 15 seconds after the quinolinimide was charged a 2.7 ml. portion of hydrochloric acid was added to the reaction mixture to lower the pH to 6.5. The reaction was then continued for a period of 16 minutes during which time the temperature of the reaction mixture rose to 32.9° C. and the pH rose to 6.9. At this time the slurry which had formed was filtered and crude 3-azaisatoic anhydride was recovered, washed with water and dried at a temperature below its decomposition point. The recovery was 1.6 grams or 20.0 percent of theory. The material was light tan in color, and had a melting point of 206°–207° C. (dec.).

EXAMPLE 5

A 150 ml. beaker equipped with a stirrer and thermometer, and surrounded by a cooling bath, was charged with 35 ml. of tap water and 2 grams NaOH pellets. After the pellets were dissolved the solution was at a temperature of 26° C. Following this 7.4 grams quinolinimide were added to the solution with constant stirring. Agitation was continued throughout the remaining steps of the process. Immediately after the addition of quinolinimide, 3.72 grams of NaOCl in solution were charged to the reaction mixture and washed down with 15 ml. water. At this point a temperature of the reaction mixture was 32° C. and the pH was 11.5. The reaction was continued for a period of approximately 25 minutes. During that time the temperature of the reaction mixture rose to approximately 40° C. at which time the cooling bath was applied and the temperature reduced to 36.1° C. by the end of the reaction. During the period of the reaction the pH of the reaction mixture dropped from 11.5 at the time of the NaOCl addition to 6.95 at the end of the reaction period. After approximately 25 minutes of reaction time the reaction mixture was cooled to 30° C. and filtered. The filter cake was water-washed and dried at a temperature below its decomposition point. The recovery totaled 1.3 grams of crude 3-azaisatoic anhydride. This amounted to 15.8 percent of theory. The material was light brown in color and had a melting point of 215°–215.5° C. (dec.).

Another method of making 3-azaisatoic anhydride is set forth in example 6.

EXAMPLE 6

PREPARATION OF 3-AZAISATOIC ANHYDRIDE

A 1.38 g. portion of 2-aminonicotinic acid and 20 ml. ethyl chloroformate were added with stirring to a 100 ml. round bottom flask equipped with a reflux condenser and a heating mantle. The flask was heated to reflux, about 95°–100° C., and held at such temperature for four hours. The flask and contents were then allowed to cool to room temperature after which an insoluble greenish material, 1.6 g., was recovered by filtration. The crude product, which melted with decomposition at 166.5°–170.5° C., was reslurried in 50 ml. water for 15 minutes, and then recovered by filtration. A brownish insoluble material, 0.6 g., was obtained which melted with decomposition at 222°–222.5° C. This brownish material was dissolved in acetone at 45°–50° C., treated with activated charcoal, and recrystallized. A white material was obtained which melted with decomposition at 222°–222.5° C. The filtrate which remained after the material had been reslurried with water was found to have a pH of 1. The pH was adjusted to 5 with dilute NaOH. Filtration of this mixture yielded 0.5 g. material identified by infrared spectroscopy as only 2-aminonicotinic acid. The yield of 0.6 g. 3-azaisatoic anhydride was 61 percent of theory, based upon unrecovered 2-aminonicotinic acid. The final product was identified by infrared spectroscopy, by elemental analysis, and by nuclear magnetic resonance. THe products of examples 1–5 have been shown by infrared spectroscopy to be identical to the product produced by example 6.

It has been found that substantially the same results as reported in any of examples 1 through 5 can be achieved by a longer reaction time at a lower temperature, e.g., as low as 0° C.

Optimum yields according to the process of this invention are achieved when the reactants are used in a 1:1:1 mole ratio of quinolinimide, NaOH and NaOCl. These ratios can be varied slightly (e.g., see example 2) and acceptable results still achieved. Desirably, however, the 1:1:1 ratio is used.

It is believed that the ultimate product of reaction between sodium hypochlorite and a sodium quinolinimide solution is 2-aminonicotinic acid, 3-aminopicolinic acid, a mixture of the two, or salts thereof.*

*V. Oakes, R. Pascoe and H. Rydon, J. Chem. Soc., 1045, 1956. By controlling the stoicheometry and reaction temperature it has now been possible to stop the last reactions of the series so that 3-azaisatoic anhydride can be recovered in a high yield.

It has been found that the pH adjustment which is preferably made in practicing the instant method can be made as few as 15 to 35 seconds after all of the reactants are in solution. As previously indicated, however, it is not essential that the pH be adjusted at all. Thus, as in example 5 above no pH adjustment was made yet the pH of the reaction mixture ultimately stabilized within the desired range. In general, however, optimum results are not achieved unless the pH is artificially adjusted within a short time after all the reactants are in solution. The adjustment must be delayed a few seconds after solution is achieved.

The specific acid used to adjust the pH is not critical. HCl is preferred; however, $H_2SO_4$, acetic and similar acids are also operable.

It has also been determined that it is substantially immaterial in what order the reactants are added to the reaction mixture. Thus, both the sodium hydroxide and the sodium hypochlorite can be charged before the quinolinimide. Optimum results, however, are achieved when the sodium hypochlorite is charged last.

The 3-azaisatoic anhydride produced by the method of this invention can in turn be used in the production of 2-amino-N-substitued nicotinamides and 3-substitued pyrido [2,3-d] pyrimidine-2,4(1H,3H)-diones, compounds known to be effective in controlling weeds. For example, 3-isopropyl pyrido[2,3-d]pyrimidine-2,4(1H,3H)-dione can be dissolved in acetone and sprayed onto soil which has been prepared for planting. A light working of the soil after spray application is desirable, e.g. by dragging or disking to work the 3-isopropyl pyrido[2,3-d]pyrimidine-2,4(1H,3H)-dione into the soil. The soil can then be planted in a conventional manner. The 3-isopropyl pyrido[2,3-d]pyrimidine-2,4(1H,3H)-dione, applied at a rate of 16 pounds per acre, is innocuous to alfalfa, but shows herbicidal activity against volunteer corn, wild oats, cheat grass, foxtail, barnyard, crab grass, nut grass, Johnson grass, volunteer snap beans, soybeans, pig weed, lambsquarter and marigold and, at higher application rates, can be used as a total herbicide.

It has also been found that the 2-amino-N-substituted nicotinamides are useful as herbicides. For example, 2-amino-N-isopropylnicotinamide can be dissolved in acetone and used as described in the preceding paragraph hereof at an application rate of 16 pounds per acre as a preemergence herbicide for the control of wild oats.

These compounds can be produced in the following manner, the production of 3-isopropyl pyrido[2,3-d] pyrimidine-2,4(1H,3H)-dione, a particularly effective weed killer, being used for demonstrative purposes.

A quantity of 3-azaisatoic anhydride is first produced in accordance with the method of the invention. The 3-azaisatoic anhydride is then reacted with isopropyl amine to form 2-amino-N-isopropylnicotinamide. This reaction is conducted in a solvent, such as dimethylformamide. This reaction can be illustrated as follows:

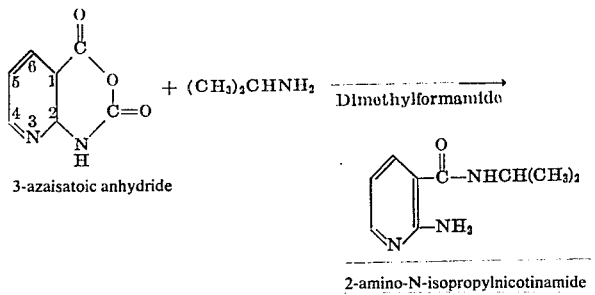

In its essential details the process involves mixing together in a suitable reaction vessel, with effective agitation, the 3-azaisatoic anhydride and sufficient dimethylformamide solvent to provide a stirrable slurry. The isopropyl amine is added to the vessel and the reaction is allowed to proceed to completion.

A preferred method comprises heating the reaction mixture containing the 3-azaisatoic anhydride to a temperature at which carbon dioxide is vigorously evolved but not so high as to cause decomposition or vaporization of the isopropyl amine or of the solvent medium, and gradually adding the amine to the heated reaction mixture. If desired, the amine can be admixed with a part of the dimethylformamide solvent. This is conveniently done at room temperature, and the reaction mixture is then heated to a predetermined temperature to form a clear solution. The temperature is determined by the nature of the amine and the boiling point of the solvent. This temperature is usually about 30°–60° C., preferably about 45°–50° C.

The reaction temperature is maintained for as long as carbon dioxide evolution is evident. If desired the reaction vessel used can be equipped with a condenser and a bubbler attached to the top of the condenser. The tube from the bubbler is first positioned in a test tube containing BaO which shows by precipitation of barium carbonate when carbon dioxide evolution has begun. After the carbon dioxide test is positive, the bubbler tube is transferred to another test tube containing the solvent which makes up the major solvent medium. When gas evolution is no longer evident, the reaction can be considered complete.

The amine addition can be made rapidly but it is preferred to make dropwise additions over a period of about an hour to several hours depending on the amount of the dimethylformamide used. This amount should be at least 20 ml. per gram mole of 3-azaisatoic anhydride used. When a lesser amount of the dimethylformamide is used longer addition and reaction times are usually required.

The dimethylformamide solvent may be used alone or admixed with enough of an inert solvent so that the total amount of the solvent system provides a stirrable slurry. It has been found that a total solvent volume of 2½ liters for one gram mole of 3-azaisatoic anhydride is a desirable proportion.

A 1:1 mole ratio of amine to anhydride is preferred, but up to about a 5 percent excess of either can be tolerated. If the mole ratio is less than 1:1, unreacted 3-azaisatoic anhydride may form various condensed and oxidized byproducts. A mole ratio greater than 1:1 may reduce to some degree the yield of the nicotinamide in favor of a substituted urea. After the amine addition is complete the reaction mixture is held at the reaction temperature and agitated throughout the remaining reaction period. The reaction mixture may be quenched with a large amount of water and the product filtered off, but better yields are obtained by removing the solvent by vacuum stripping. The resulting mixture is allowed to cool and is then quenched with a large amount of water; at least 6 parts of water to 1 part of reaction mixture by volume is preferred.

The precipitate formed is filtered off and is treated with caustic. This step converts any unreacted 3-azaisatoic anhydride to the corresponding soluble sodium salt. The nicotinamide is not soluble and is filtered off.

The 2-amino-N-isopropylnicotinamide is then reacted with phosgene to effect ring closure and formation of 3-isopropyl pyrido[2,3-d]pyrimidine-2,4(1H,3H)-dione.

The reaction occurs in two steps. Hydrogen chloride from the phosgene is absorbed during both steps. The first step occurs spontaneously, and is exothermic in nature. The second step occurs only slowly unless the reaction mixture is heated above ambient temperature. Both steps must be carried out in the presence of an HCl absorber. The second step occurs readily at temperatures in the vicinity of 100° C., so that the reaction temperature can readily be controlled by the use of a suitable solvent for the nicotinamide and by supplying sufficient heat to cause vaporization of the solvent while using a reflux condenser to return the vaporized solvent to the reaction mixture. The solvent must be one which vaporizes, under the pressure at which the reaction is conducted, at a temperature sufficiently high to enable evolution and absorption of HCl from the second step of the reaction, and, if solvent reflux is utilized for temperature control purposes, must also vaporize at a temperature sufficiently low that decomposition does not occur within the reaction mixture. In addition, the solvent must be one which is inert relative to phosgene. Examples of suitable solvents that are admirably adapted for use when the reaction is conducted under ordinary ambient pressure include p-dioxane, p-xylene and 1,1,2,2-tetrachloroethane.

The overall reaction for the production of 3-isopropyl-pyrido[2,3-d]pyrimidine-2,4(1H,3H)-dione, is illustrated below:

Reaction for Production of 3-Isopropyl-Pyrido[2,3-d]Pyrimidine-2,4(1H,3H)-Dione

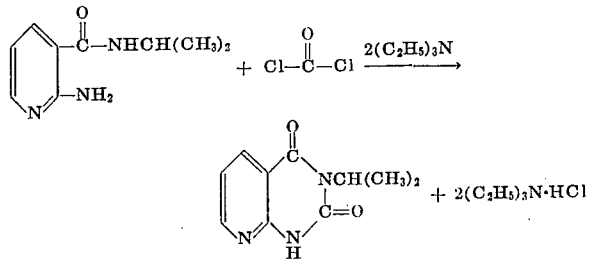

It is essential that the above reaction be carried out in the presence of an HCl absorber because in its absence the pyridine moiety of the isopropyl amide absorbs the HCl given off during the reaction, thus retarding the reaction. In the presence of an HCl absorber that is more active than the pyridine moiety, the reaction proceeds as indicated. The preferred HCl absorber is triethylamine, however, other HCl absorbers such as pyridene achieve the same result.

The procedure described in example 1, above, can be repeated substituting equivalent amounts of a carbonate of Li, K, or Na, a hydroxide of Li, K, Mg or Ca, or an oxide of Li, K, Na, Mg or Ca, or metallic Li, K, Na or Ca for the sodium hydroxide, and, also, substituting equivalent amounts of a hypochlorite of Li, K, Mg or Ca or of a hypobromite of Li, K, Na, Mg or Ca for the sodium hypochlorite. In all cases, results substantially equivalent with those of the example can be achieved. It is apparent, therefore, that any compound reactive with quinolinimide to produce a water-soluble salt can be used in place of sodium hydroxide and that any metal hypohalite, preferably any hypochlorite, can be used in place of the sodium hypochlorite in producing an acid anhydride according to the invention. Alkali metal hydroxides, most desirably sodium hydroxide, alkali metal hypochlorites, most desirably sodium hypochlorite, and hydrochloric acid, as used in the procedure of example 1, are preferred reactants because of their ready availability and comparatively low cost. Azaisatoic anhydride can be produced in accordance with the invention by either continuous or batchwise operations. As will be apparent to one skilled in the art various changes and modifications can be made from the specific procedures set forth above without departing from the spirit and scope of the attached claims.

What I claim is:

1. A compound of the formula

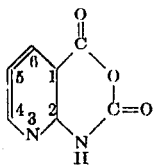

2. The method of producing 3-azaisatoic anhydride which comprises the steps of (1) reacting in an aqueous solution quinolinimide with substantially equimolecular proportions of sodium hydroxide and sodium hypochlorite, said reaction being conducted at a temperature lower than about 40° C., and (2) adjusting the solution to and maintaining it at a pH between about 5½ and about 7½ after all of the reactants are in solution.

3. A method of producing 3-azaisatoic anhydride which comprises the steps of (1) mixing quinolinimide and a substantially equimolecular proportion of sodium hydroxide with water, at a temperature not higher than about 40° C., and at least sufficient in quantity to dissolve the sodium quinolinimide which is formed, (2) adding, per mole of quinolinimide, about 1 mole of sodium hypochlorite to the resulting solution, and (3) adjusting the reaction mixture to a pH between about 5½ and about 7½, the entire reaction being carried out at a temperature lower than about 40°C.

4. A method of producing 3-azaisatoic anhydride which comprises reacting in a water medium substantially simultaneously quinolinimide, a substantially equimolecular proportion of sodium hydroxide, and about one mole of sodium hypochlorite per mole of quinolinimide, and carrying out the reaction at a temperature not higher than about 40° C. the amount of water present being sufficient to dissolve the sodium salt of quinolinimide formed during the course of the reaction.

5. The method of producing 3-azaisatoic anhydride which comprises the steps of (1) reacting in an aqueous solution a water soluble salt of quinolinimide with substantially equimolecular proportions of a compound selected from the group consisting of alkali and alkaline earth metal hypochlorite and hypobromite, said reaction being conducted at a temperature lower than about 40° C., and (2) adjusting the solution to and maintaining it at a pH between about 5½ and about 7½ after all of the reactants are in solution.

* * * * *

UNITED STATES PATENT OFFICE
CERTIFICATE OF CORRECTION

Patent No. 3,622,573          Dated April 18, 1972

Inventor(s) George F. Schlaudecker

It is certified that error appears in the above-identified patent and that said Letters Patent are hereby corrected as shown below:

Delete claim 2, column 7, lines 20-29.

Delete claims 3-5, column 8, lines 1-28.

Signed and sealed this 19th day of September 1972.

(SEAL)
Attest:

EDWARD M. FLETCHER, JR.
Attesting Officer

ROBERT GOTTSCHALK
Commissioner of Patents